United States Patent [19]

Snowden

[11] 4,129,523

[45] Dec. 12, 1978

[54] CATALYSTS CONTAINING ACTIVE METALLIC COPPER

[75] Inventor: Paul Snowden, Norton, England

[73] Assignee: Imperial Chemical Industries Limited, London, England

[21] Appl. No.: 736,499

[22] Filed: Oct. 28, 1976

[30] Foreign Application Priority Data

Nov. 4, 1976 [GB] United Kingdom ............... 45758/76

[51] Int. Cl.$^2$ ..................... B01J 21/04; B01J 23/06; B01J 23/72; B01J 23/26
[52] U.S. Cl. .................................. 252/475; 252/463; 252/468; 252/476; 423/656
[58] Field of Search ............... 252/463, 468, 475, 476, 425/656

[56] References Cited

U.S. PATENT DOCUMENTS

| 3,388,972 | 6/1966 | Reitmeier et al. | 252/475 X |
| 3,390,102 | 6/1968 | Reitmeier | 252/475 |
| 3,514,261 | 5/1970 | Bridger et al. | 252/468 X |
| 3,546,140 | 12/1970 | Gutmann et al. | 252/475 X |

*Primary Examiner*—W. J. Shine
*Attorney, Agent, or Firm*—Cushman, Darby & Cushman

[57] ABSTRACT

A catalyst containing metallic copper, especially a low temperature shift catalyst containing also zinc oxide, is made from a corresponding catalyst precursor by reduction in two stages. In the first stage a steam and/or $CO_2$-diluted reducing gas is used and in the second a more strongly reducing gas mixture such as ammonia synthesis gas or even 100% hydrogen. The resulting catalyst is substantially more active than one reduced according to previous one-stage steam-reduction practice and similar to catalyst made by the less convenient dry-reduction using nitrogen or natural gas as diluent.

6 Claims, No Drawings

CATALYSTS CONTAINING ACTIVE METALLIC COPPER

THIS INVENTION RELATES to catalysts and in particular to a method of making a catalyst containing active metallic copper.

Catalysts containing active metallic copper have come into widespread use for processes such as low temperature carbon monoxide shift, methanol synthesis and minor uses such as hydrogenations, oxygen absorption and sulphur absorption. It has been known since the late 1920s that when such metallic copper catalysts are made by reducing a corresponding copper oxide composition, the reduction must be carried out with great care, otherwise the catalyst has low activity. The reduction procedure that has become most common involves passing hydrogen strongly diluted (for example down to 0.2% v/v $H_2$) with a dry non-reactive gas such as nitrogen or natural gas over the oxide composition and very cautiously increasing the temperature (to finally 250° C.) and the hydrogen proportion (to finally 5-10% v/v). When steam has been used as the diluent, the activity of the catalyst has been observed to be less than when using dry gas, and therefore steam is not used if a dry diluent is available.

We have now found that steam can be used as the diluent provided that reduction with hydrogen and steam is followed by treatment with a more strongly reducing gaseous medium.

According to the invention a method of making a catalyst containing active metallic copper from a corresponding catalyst precursor containing copper oxide comprises treating the precursor with a reducing gas mixture containing at least 50% of steam and/or carbon dioxide until a substantial proportion of the copper oxide has been reduced to metallic copper and thereafter treating it with a more strongly reducing gas mixture.

The catalyst precursor usually contains in addition to copper oxide one or more oxides that are not or substantially not reducible by hydrogen at atmospheric pressure. Among these oxides are alumina, chromia and zinc oxide and mixtures thereof in catalysts in common use. The copper oxide CuO content of such catalysts is typically in the range 10-75% by weight. Especially important catalyst precursors to which the invention is applicable include zinc oxide, particularly those in which the ZnO/CuO molar ratio is between 0.5 and 3, without or with other non-reducible oxides; or chromium oxide, for example in so-called copper chromite, in which the molar ratio of CuO to $Cr_2O_3$ is between 0.5 and 2.5. The invention is particularly applicable to ternary catalyst precursors such as copper oxide/zinc oxide/alumina in which the alumina content is up to 55% by weight, especially in the range 2.5 to 20% by weight, copper oxide/zinc oxide/chromium oxide in which the chromium oxide content is in the range 2.5 to 30% by weight as $Cr_2O_3$, and analogous catalysts containing both alumina and chromium oxide. Catalyst precursors containing, in addition to copper oxide and preferably zinc oxide, the oxides of boron, silver, vanadium, rare earth metals, uranium, or manganese, singly or in combinations with each other or with aluminium and/or chromium, can equally well be reduced by the method of the invention.

The reducing gases that may be used include hydrogen and carbon monoxide and compounds that react readily to give hydrogen and/or carbon oxides, such as methanol, dimethyl ether, methyl formate and ammonia. When hereinafter reference is made to "equivalent hydrogen", this means the quantity of hydrogen produced by reacting such compounds completely with steam or completely decomposing them. Mixtures containing such gases may be used, for example methanol synthesis gas or purge gas, ammonia synthesis gas or purge gas, or hydrogen-containing town gas. The non-reactive gases such as nitrogen, methane and noble gases present in such mixtures do not interfere, but some mixtures containing unsaturated hydrocarbons are to be avoided owing to the risk of carbon formation over the catalyst. Naturally they should be free of catalyst poisons. Temperature control precautions should be taken when for example there is an accompanying exothermic or endothermic reaction of the gaseous components.

The reduction in the presence of steam and/or carbon dioxide should be carried out with precautions to avoid over-heating the catalyst as a result of the strongly exothermic copper oxide reduction reaction. The temperature should not be allowed to exceed 275° C. at any point in the catalyst bed. How this is done depends on what type of reactor is to be used. If it is equipped with tubes containing coolant or if the catalyst is in tubes surrounded by coolant the content of reducing gas can be high, for example over 10% v/v, and in the most favourable conditions of cooling there is less gained by using the method of the invention. In the much more usual situation of an uncooled catalyst bed, the proportion of reducing gas should be controlled such that the heat of reduction is absorbed by the diluent gas without increasing this temperature above 275° C. The catalyst bed is preferably equipped with several internal thermometric points. Typically the content of reducing gas, calculated as equivalent hydrogen, is under 3% v/v, most commonly under about 1% and possibly 0.5% v/v, at the start of reduction. The catalyst precursor is first heated dry, for example by hot air, to above the dew point of the steam. Then steam-diluted reducing gas is fed and the temperature gradually increased until reduction begins. Reduction usually begins at between 150° and 170° C., but may begin at a lower temperature or possibly up to about 220° C., and will be evident from an increase in temperature in the bed. During reduction the reducing gas supply may be decreased or stopped in order to prevent an excessive rise in temperature, but normally will be maintained or gradually increased to 3-10% v/v as reduction proceeds. A hot spot will gradually pass through the catalyst bed. When it reaches the outlet, this first stage of reduction is complete. Alternatively or additionally the progress of reduction can be monitored by analysing the gas mixture leaving the bed for the presence of unconsumed reducing gas or for the gaseous products of the reduction.

The space velocity for the first stage is suitably in the range 200-10000 hour$^{-1}$. The pressure is conveniently atmospheric but can be up to the pressure at which steam condenses at the temperature of operation. A suitable range is thus 1-50 atm. abs.

The product of the reduction in the presence of at least 50% v/v of steam and/or carbon dioxide can now be treated with a reducing gas without precautions to avoid overheating, provided the temperature is controlled at under 275° C. and provided the first stage reduction has been sufficiently complete. The reducing gas can be used undiluted or with the minor degree of dilution typical of available gases such as ammonia synthesis gas ($N_2+3H_2$) provided the first reduction stage has been sufficiently complete. If desired an intermediate reduction using reducing gas with an added diluent other than steam and/or carbon dioxide can be used, for example when such a diluent is available in small quantities, whereafter full-strength reducing gas is used to finish the reduction.

The stages of reduction are most conveniently carried out by the user of the catalyst in the reactor in which the catalyst is to be used. If desired, however, the first stage can be carried out by the catalyst manufacturer and followed by stages of cooling and drying and, if necessary, (depending on how far reduction has proceeded) stabilisation by means of dilute oxygen (for example 0.2% v/v initially, rising to 5%, at a temperature kept at under 70° C.), by which the metallic copper is superficially oxidised. The product of such a procedure is a so-called "pre-reduced" catalyst, which can be transported to the user's reactor and reduced in a short time with reducing gas at any strength. In order to obtain the advantages of the invention the user should employ reducing gas substantially free of steam and/or carbon dioxide. Alternatively the stabilisation procedure may be applied to catalyst after all the stages of reduction.

The cooled, dried and possibly stabilised product of the reduction in the presence of steam and/or carbon dioxide is believed to be a new composition of matter.

The gaseous medium used in the second stage of reduction should contain, if any steam and carbon dioxide, less than will be present in the process gas. Thus when the catalyst is to be used in a shift process, the content of steam and carbon dioxide is normally less than 25% by volume in the second stage gas and preferably it is less than 5% by volume. We believe that the advantage resulting from the use of the method of the invention is due to ensuring that the catalyst before use is subjected to an atmosphere more strongly reducing than that which will prevail during use in a shift process. Possibly there is some reduction of other oxides present, especially of zinc oxide. The invention is not, however, limited to any particularly chemical mechanism.

The space velocity of the second stage is suitably in the range 200-10000 hour$^{-1}$. The pressure is conveniently atmospheric but can, if desired, be higher than in the first stage owing to the lower partial pressure of steam and the generally higher temperature.

The invention provides further a method of regenerating a metallic copper-containing catalyst that has been used to treat a process gas containing steam and/or carbon dioxide, which comprises treating it with a reducing gaseous medium containing little if any steam and/or carbon dioxide as hereinbefore described.

The invention includes chemical processes, especially a low-temperature (under 300° C., especially 190°-270° C.) carbon monoxide shift process, in which the catalyst precursor has been reduced at start-up by the method of the invention and/or has been regenerated by the second reduction stage of the method of the invention. Such a shift process, in which carbon monoxide is reacted with steam to give carbon dioxide and hydrogen, may be combined with upstream gas generation stages such as hydrocarbon steam reforming or catalytic or non-catalytic partial oxidation or coal or coke gasification, for producing the starting carbon monoxide containing gas, and may be used in conjunction with a preceding high temperature shift stage (350°-500° C., iron-chrome catalyst). Such generation stages commonly include a supply of hot process air or combustion air, which may conveniently be used in the initial heating of the shift catalyst precursor. The shift process according to the invention may be combined with downstream stages such as carbon dioxide removal and methanation or cryoscopic purification to produce synthesis gases or hydrogen. For such a low temperature shift process the catalyst precursor is preferably one of those containing zinc oxide and possible also alumina or chromium oxide.

Other processes in which catalysts made by the method of the invention may be used include methanol synthesis, hydrogenation of aldehydes and esters to alcohols, dehydrogenation of secondary alcohols to ketones, absorption of traces of oxygen from gases, and absorption of sulphur from gases containing sulphur compounds.

The copper-containing catalyst may be produced from the precursor or stabilised or used or regenerated under the protection of a guard material to keep from it poisons such as compounds of sulphur or halogens.

EXAMPLE 1

A 25 ml sample of a commercially available low temperature shift catalyst precursor having the weight percentage composition CuO 34.0, ZnO 54.0, $Al_2O_3$ 12.0 in the form of 3.6 by 5.4 mm squat cylindrical pellets, was charged to an electrically heated laboratory test reactor and heated to 80° C. in a stream of dry nitrogen. Then with continued heating the nitrogen stream was replaced by a stream of a 3% v/v hydrogen in steam mixture at the rate of 150 liters per hour (space velocity 6000 hour$^{-1}$). The temperature was raised at a controlled rate to 230° C. and the hydrogen-steam flow kept up at 230° C. for 4 hours. The steam content was then decreased to zero and the hydrogen flow rate increased at a controlled rate to 200 liters per hour of 100% hydrogen. The hydrogen flow was then kept going for a period, still at 230° C. The activity of the resulting catalyst was then tested by passing over it a mixture of carbon monoxide (3.3% v/v), carbon dioxide (10% v/v), hydrogen (53% v/v) and steam (33% v/v) at a space belocity of 22500 hour$^{-1}$, measuring the composition of the outlet gas and expressing the activity as a reaction velocity constant K.

All the above operations were carried out at atmospheric pressure.

The run was carried out several times at various concentrations of hydrogen in steam, heating-up rates, steam content decrease rates and 100% hydrogen treatment periods. Control runs were carried out using the hydrogen/steam treatment only and using a dry hydrogen/nitrogen mixture with carefully controlled increase of hydrogen content from an initial 0.3% v/v to a final 5.0% v/v and carefully controlled temperature increase from 100° C. to 230° C.

The values of K for these runs are shown in the Table.

TABLE

| Run No. | $H_2$ % v/v | Heating time, hr | Steam decrease time, hr | 100% $H_2$ period hr | K, sec$^{-1}$ |
|---|---|---|---|---|---|
| 1 | 0.5 | 3 | 1 | 1 | 9.4 |
| 2 | 3.0 | 1 | 1 | 1 | 9.1 |
| 3 | 0.5 | 1 | 0 | 1 | 10.5 |
| 4 | 0.5 | 1 | 1 | 15 | 10.2 |
| 5 | 3.0 | 3 | 0 | 1 | 9.2 |
| 6 | 3.0 | 3 | 1 | 15 | 11.0 |

TABLE-continued

| Run No. | H₂ % v/v | Heating time, hr | Steam decrease time, hr | 100% H₂ period hr | $K, sec^{-1}$ |
|---|---|---|---|---|---|
| 7 | 0.5 | 3 | 0 | 15 | 10.1 |
| 8 | 3.0 | 1 | 0 | 15 | 9.8 |
| Steam reduction only | 3.0 | 1 | — | 0 | 3.5 |
| Dry reduction | — | — | — | — | 10.5 |

Whereas no conclusions can be drawn as to the best selection of conditions for the two-stage reduction, it is evident that two-stage reduction produces a catalyst having for practical purposes the same activity as the catalyst produced by the established dry-reduction process and three times that resulting from reduction only in steam-diluted hydrogen.

It will be appreciated that owing to the small scale of the runs, such that adiabatic over-heating of the catalyst does not readily take place, the conditions to be used on an industrial scale would be determined using the above conditions as a general guide.

EXAMPLE 2

A low temperature shift reactor, forming part of the synthesis gas generation section of an ammonia synthesis plant and having two catalyst beds of 37 m³ total catalyst volume in the same shell, was charged with a catalyst precursor having the % w/w composition 34 CuO, 54 ZnO, 12 Al₂O₃ in the form of squat cylindrical pellets 3.6 × 5.4 mm. The pellets were warmed to 120°–150° C. by passing through the beds a current of air from the compressors supplying the secondary reformer of the plant. Steam was then passed through the beds at a space velocity of about 200 hour⁻¹ until the bed temperature reached 218° C. Hydrogen in the form of ammonia synthesis gas was then admitted at the rate of 1% v/v of the total feed. The bed temperature rose but was kept below 240° C. by adjusting the hydrogen rate. After 10 hours the bed temperature began to fall and the hydrogen rate was increased to 1.7%. After 24 hours the hydrogen rate was raised to 2% and over the next 16 hours to 5% with only a 5° C. rise in temperature. At 5% hydrogen the temperature remained steady, showing that the first stage of reduction was complete. The steam flow was then decreased to zero over 2 hours, during which the temperature rose 5° C. (hottest part of bed 232° C.), whereafter the flow of synthesis gas (74% H₂, rest N₂, CH₄ and noble gases) was maintained for 4 hours longer but caused no change in temperature. The reduced material was then cooled, the hydrogen was expelled by means of nitrogen, and the reactor sealed until the remainder of the ammonia plant was in operation.

When later the low temperature shift reactor was brought into use be feeding to it the product gas of a high temperature shift reactor, it operated at a level of out put above its design level and about equal to that of one in which the reduction of the catalyst precursor had been effected by hydrogen diluted with nitrogen.

I claim:

1. A method of making a catalyst containing active metallic copper from a corresponding catalyst precursor containing copper oxide and zinc oxide in which the molar ratio of zinc oxide to copper oxide is 0.5–3:1, which comprises treating at a temperature of 275° C. or less the precursor with a reducing gas mixture containing steam, carbon dioxide or steam and carbon dioxide totaling at least 50% v/v of the mixture and a reducing gas selected from the group consisting of hydrogen, carbon monoxide and compounds that react readily to give hydrogen and/or carbon oxides the content of reducing gas, calculated as equivalent hydrogen, being less than 3% v/v, until a substantial part of the copper oxide has been reduced to metallic copper and thereafter treating it at a temperature of 275° C. or less with a more strongly reducing gas mixture consisting essentially of a reducing gas selected from the group consisting of hydrogen, carbon monoxide and compounds that react readily to give hydrogen and/or carbon oxides and less than 25% by volume of steam, carbon dioxide or carbon dioxide and steam.

2. A method according to claim 1 in which the catalyst precursor is present in an uncooled bed and the content of reducing gas, calculated as equivalent hydrogen, in the mixture with at least 50% v/v of steam and/or carbon dioxide is under 3% v/v at the start of reduction, is maintained or increased to 3–10% v/v as the reduction proceeds, and is controlled during the reduction so that the temperature does not exceed 275° C. in the bed.

3. A method according to claim 1 in which the more strongly reducing gas mixture contains less than 5% v/v of steam and carbon dioxide.

4. A method according to claim 1 in which the product of the first stage of reduction is cooled, dried and, if necessary, stabilised by dilute oxygen, to give a prereduced catalyst, and the second stage of reduction is carried out in the reactor in which the catalyst is to be used.

5. A method according to claim 1 in which the catalyst precursor additionally contains 2.5 to 20% of alumina or 2.5 to 30% w/w of chromium oxide as $Cr_2O_3$.

6. A method according to claim 1 wherein said compounds that react readily to give hydrogen and/or carbon oxides are selected from the group consisting of methanol, dimethylether, methylformate and ammonia.

* * * * *